Dec. 23, 1958     T. M. BALL     2,865,221
MOTOR VEHICLE POWER TRANSMISSION
Filed Aug. 24, 1940     5 Sheets-Sheet 1
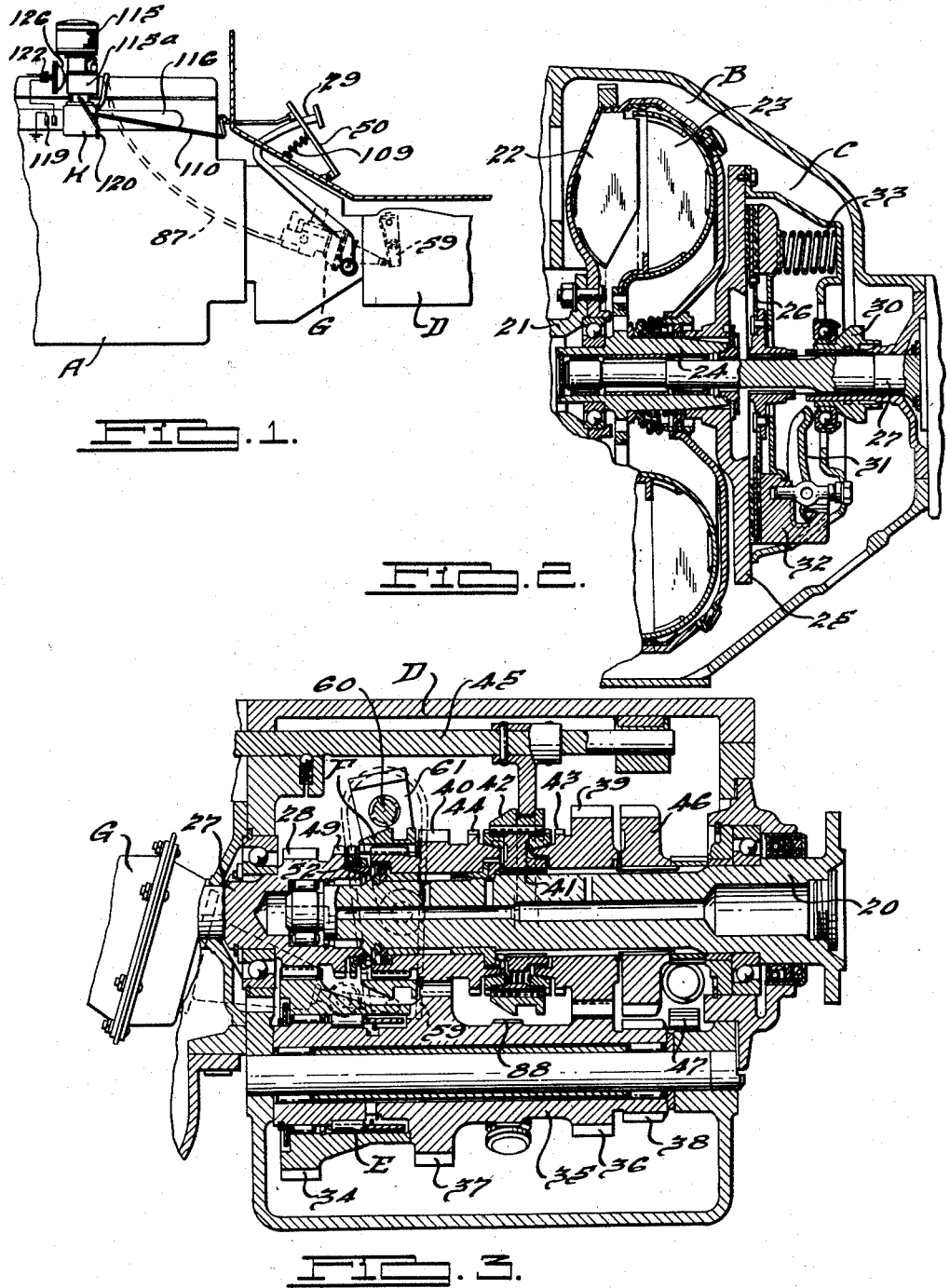
INVENTOR
Thomas M. Ball.
BY
Harness, Lind, Peter & Harris
ATTORNEYS.

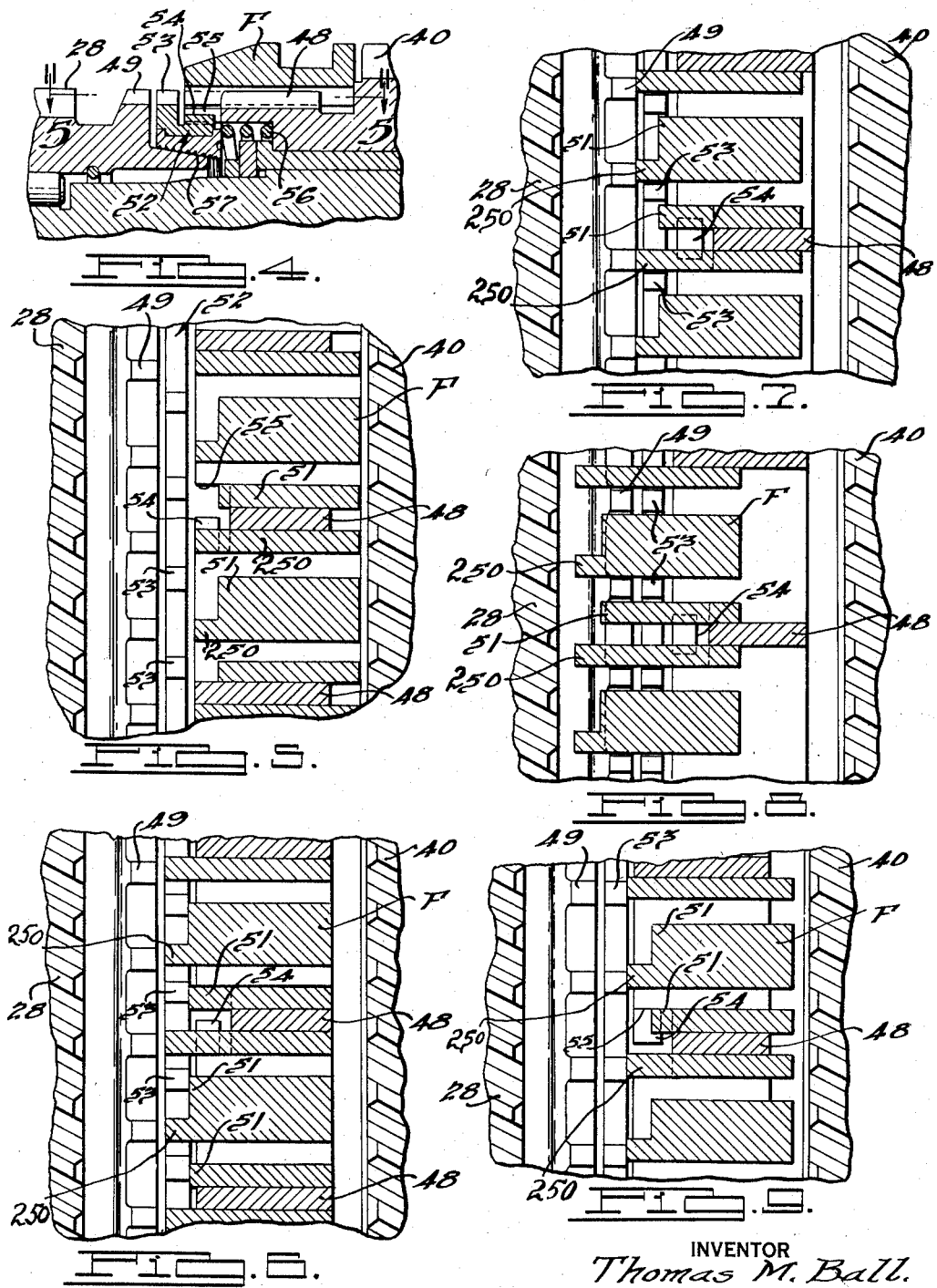

Dec. 23, 1958     T. M. BALL     2,865,221
MOTOR VEHICLE POWER TRANSMISSION
Filed Aug. 24, 1940     5 Sheets-Sheet 3
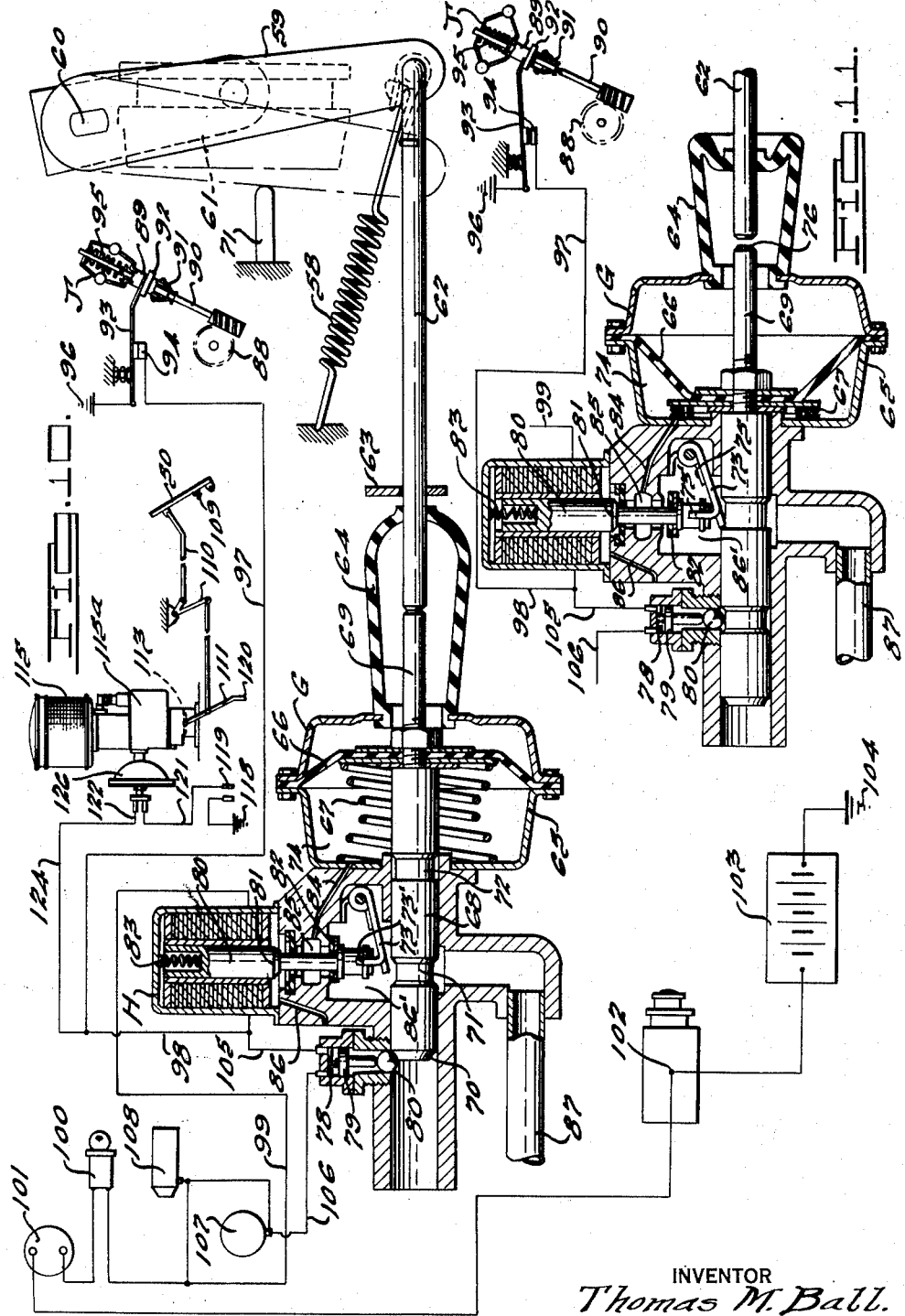
INVENTOR
*Thomas M. Ball.*
BY
ATTORNEYS.

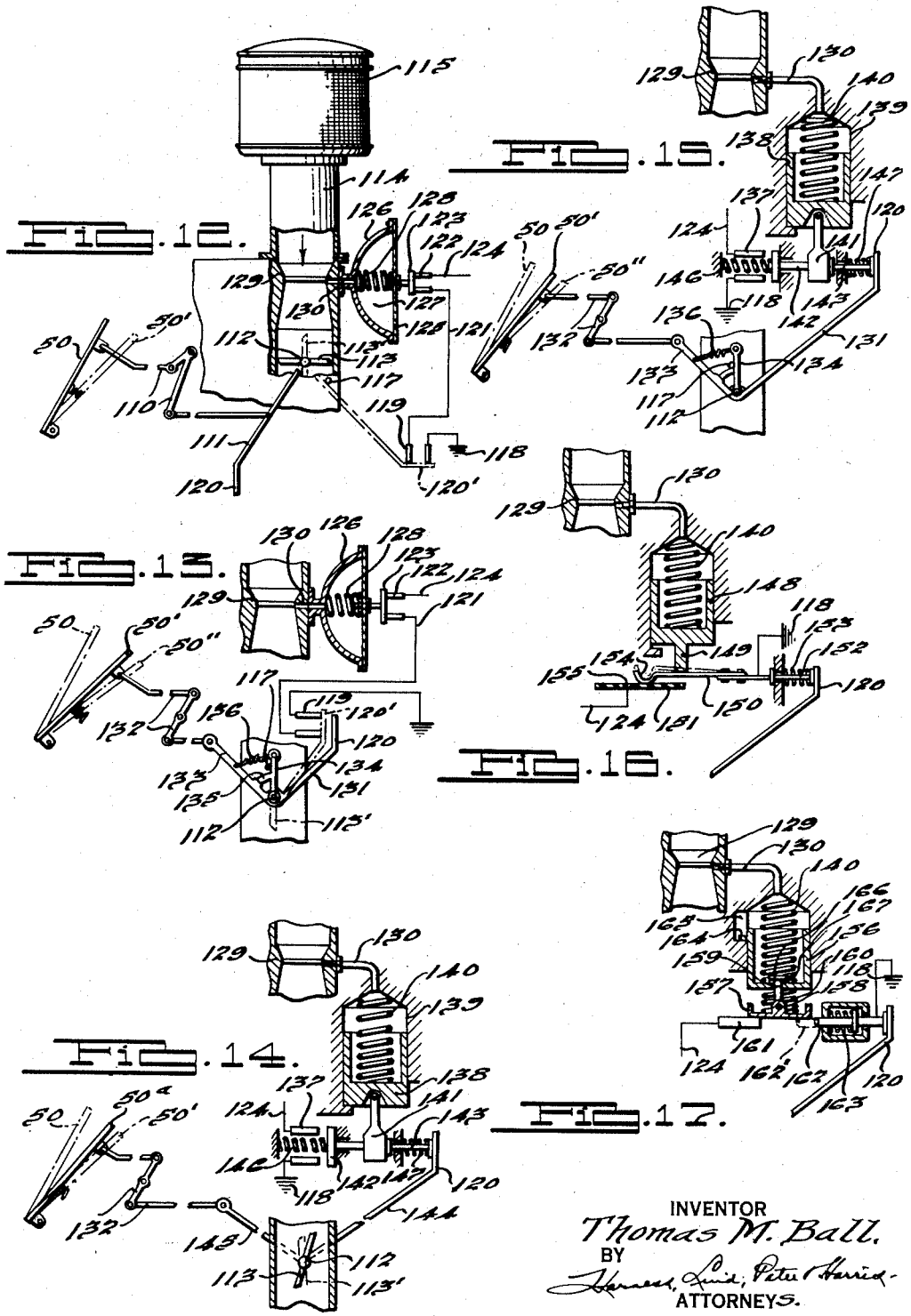

Dec. 23, 1958 T. M. BALL 2,865,221
MOTOR VEHICLE POWER TRANSMISSION
Filed Aug. 24, 1940 5 Sheets-Sheet 5
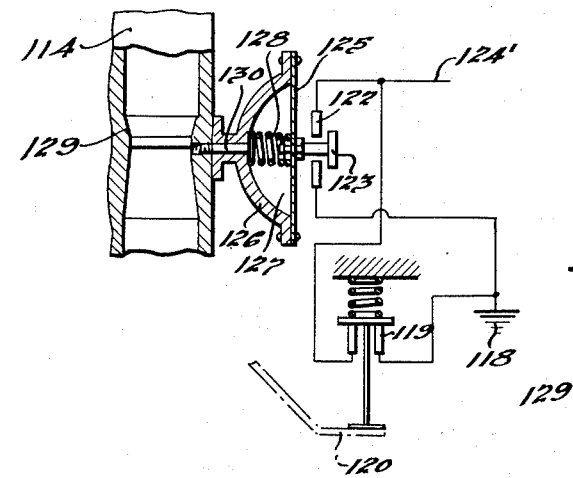
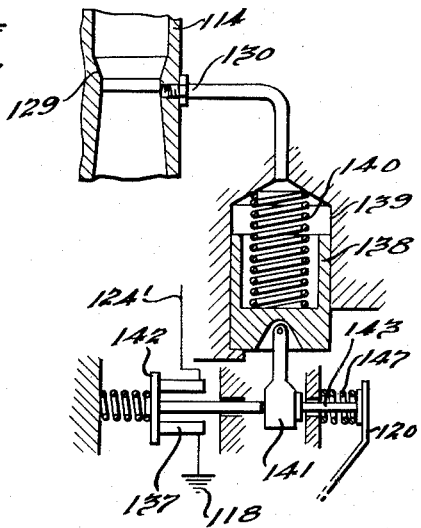
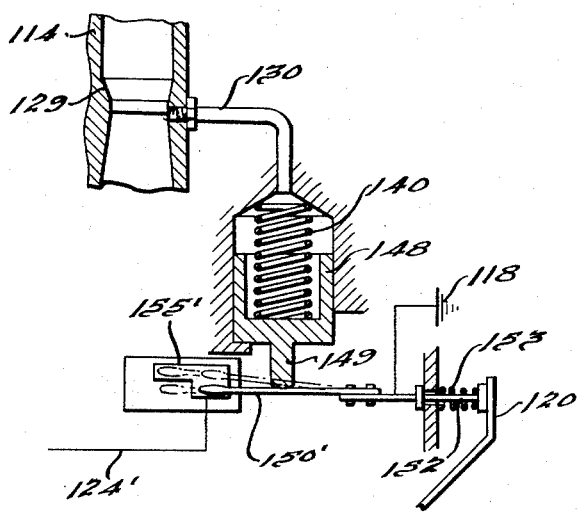
INVENTOR
Thomas M. Ball.
BY
Harness, Lind, Peter Harris-
ATTORNEYS.

United States Patent Office 2,865,221
Patented Dec. 23, 1958

2,865,221

MOTOR VEHICLE POWER TRANSMISSION

Thomas M. Ball, Detroit, Mich., assignor to Chrysler Corporation, Highland Park, Mich., a corporation of Delaware Application August 24, 1940, Serial No. 354,055

13 Claims. (Cl. 74—472)

This invention relates to motor vehicles and refers more particularly to power transmission and control mechanism therefor.

One object of my invention is to provide improved means for controlling changes in the speed ratio or driving conditions of a power transmission mechanism.

Another object is to provide means utilizing the engine intake system to control speed ratio change under predetermined desired speed of travel of the vehicle.

A further object is to provide an improved control means for driver-operated change speed mechanism.

A further object is to provide a novel control system for any type of operating device having an engine operably associated therewith. In its broader aspects my invention is not limited to control of transmission speed change.

Further objects and advantages of my invention will be more apparent from the following illustrative embodiment thereof, reference being had to the accompanying drawings in which:

Figure 1 is a side elevational view showing a motor vehicle engine and power transmission equipped with my invention.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship from the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a diagrammatic view of the control mechanism for the automatic clutching sleeve, the latter being shown in its released position.

Fig. 11 is a similar view of a portion of the Fig. 10 control mechanism in another operating position.

Fig. 12 is an enlarged somewhat diagrammatic view of my speed ratio changing control device as employed in the Fig. 10 system.

Fig. 13 is a similar view showing a modified arrangement of driver operating means.

Figs. 14 to 17 are similar views each showing other modifications of my control device.

Fig. 18 is a diagrammatic view illustrating a further modification of my control device.

Figs. 19 and 20 are similar views showing further modifications of my control means.

While my control may be employed in conjunction with various types and arrangements of mechanisms and devices, I have illustrated the principles of my invention in connection with a motor vehicle transmission. It is desirable to illustrate one driving system in order to describe the functioning of my control and to this end I have shown certain salient parts of the transmission system which is more fully described and claimed in the copending application of Carl A. Neracher, et al., Serial No. 335,310, filed May 15, 1940, now Patent No. 2,445,943 dated December 14, 1948.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50 thereby closing the engine throttle valve and allowing the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 250, 51 certain of which may be bridged or joined together. A blocker ring 52 is provided with blocking teeth 53 which either lie in the path of forward shift of teeth 250 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and third, the speed of shaft 27 exceeds the speed of gear 40 so that, if sleeve F is fully released, the parts will be positioned as in Fig. 5 wherein the blocker leads the sleeve F thereby positioning blocker teeth 53 axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodating of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 250 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 250, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 250 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 250 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manually shiftable sleeve 42. Then on releasing the accelerator pedal the sleeve F will synchronously clutch with teeth 49 during coast to step-up the drive to either second or fourth as aforesaid.

The transmission is provided with suitable prime mover means for controlling shift of sleeve F along with several control means. Referring particularly to Figs. 10 and 11 there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Forward shift of sleeve F is effected, under control of motor G, by reason of a spring 58 fixed at one end and exerting a pull on lever 59 which is connected to sleeve F through the crossshaft 60 and shifter yoke 61. Pivoted to the lower end of lever 59 is a follower rod 62 guided in a support 63 and in the rubber sealing boot 64 carried by cylinder 65 which contains the diaphragm piston 66 urged in a direction to release sleeve F by a spring 67 which is much stronger than spring 58. Diaphragm piston 66 is connected to a leader rod 68 which has a rear extension 69 aligned with rod 62.

Rod 68 has a series of detents 70, 71 and 72, the latter cooperating with a latch 73 such that when vacuum is admitted to chamber 74 to cause the piston 66 and rod 68 to assume their Fig. 11 positions, latch 73 under action of rat-trap spring 75 catches on the forward shoulder of detent 72 and holds the parts as in Fig. 11. At this time rod portion 69 moves further than rod 62 by the amount of gap 76, a stop 77 acting on lever 59 limiting forward movement of sleeve F by spring 58.

In order to provide for release of sleeve F, it is desirable to provide some means for momentarily relieving the torque load at the teeth 49 and sleeve F and in the present instance I have provided such means as a system of grounding the distributor of the ignition system whereby the engine ignition may be momentarily rendered ineffective thereby unloading the torque at sleeve F sufficiently to insure its release by spring 67. This ignition interrupting system is under control of an interrupter switch 78 which is closed by plunger 79 and ball 80 whenever rod 69 moves between the Fig. 10 and Fig. 11 positions by reasons of the enlarged rod portion between detents 70, 71. Detent 71 is so arranged that, with the parts as in Fig. 11 and sleeve F clutched, rod 68 may move rearwardly sufficiently to close gap 76 at the lost-motion between rod portion 69 and rod 62, this movement causing switch 78 to close and ground the ignition system whereupon spring 67 may then cause further movement of rod 68 and rod 62 to release sleeve F, the switch 78 then opening by detent 70 to restore the ignition system.

The vacuum supply to chamber 74 is under control of solenoid H which comprises an armature plunger 80 having valving parts 81, 82. In Fig. 10 the solenoid H is energized thereby raising plunger 80 against spring 83 to seat valve 82 and shut off the vacuum supply to chamber 74 and at the same time unseat valve 81 so as to vent this chamber through passage 84, chamber 85 and vent passage 86. When the solenoid is de-energized then spring 83 lowers plunger 80 thereby seating valve 81 to shut off vent 86 and open valve 82 as in Fig. 11 thereby opening chamber 74 to the engine intake manifold K through passage 84, chamber 86', and pipe 87.

A certain lost motion is provided between plunger 80 and the inwardly bent finger 73' of latch 73 so that when the plunger moves downwardly the latch may subsequently catch at detent 72 when vacuum operates piston 66, the parts then remaining in the Fig. 11 position independently of vacuum in chamber 74 until solenoid H is energized to release the latch and vent chamber 74.

It is deemed preferable to provide a speed control on the energization of solenoid H so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 88 is a governor J of any suitable type, this governor operating a sleeve 89 outwardly along its drive shaft 90 as the car speed reaches a predetermined point, the break-away being under control of a detent 91 if desired.

The sleeve 89 has a shoulder 92 engaged by the swinging switch piece 93 of the governor switch 94. When the car is stationary the detent 91 is engaged and switch 94 is closed. As the car accelerates, the governor eventually reaches its critical speed and detent 91 releases thereby causing switch 94 to open. As the car slows down, the governor spring 95 restores the parts to the Fig. 10 position and by proportioning the various parts it is obvious that switch 94 may be made to function at desired speeds proportionate to car travel. As an example of one arrangement of governor operation and gearing arrangement, the governor may be made to open switch 94 during car acceleration in first and third respectively at approximately 7 and 15 M. P. H. (miles per hour), the switch 94 closing on stopping the car in direct and second at approximately 7 and 3 M. P. H. respectively.

When switch 94 closes then the solenoid H is energized to vent chamber 74, a circuit being established from ground 96 through switch 94 and conductors 97, 98 to solenoid H thence by conductor 99 to ignition switch 100, ammeter 101, starter terminal 102, battery 103 and ground 104.

The interrupter switch 78 is in series with switch 94, a branch conductor 105 extending between conductor 98 and one terminal of switch 78, the other terminal being connected by a conductor 106 to the distributor 107 and coil 108 in such manner as to ground and render inoperative the engine ignition by closing interrupter switch 78.

In the operation of the mechanism as thus far described, the car at standstill and with ignition switch 100 closed will cause the solenoid H to be energized as in Fig. 10 because governor switch 94 is closed. Cylinder 74 is vented and sleeve F disengaged. The driver shifts sleeve 42 to either the high or low range and accelerates the car ordinarily above the critical speed of governor J causing switch 94 to open. As vacuum builds up in the engine intake manifold K, plunger 80 now being lowered because switch 94 is open, piston 66 will be operated by vacuum thereby moving rod 68 to its Fig. 11 latched position. As soon as the driver allows the engine to coast, sleeve F will engage teeth 49 synchronously, to step-up the drive to either second or fourth although the step-up will be delayed until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all stops and starts made without further shifting. This is possible owing to slippage in the fluid coupling when stopping the car for a traffic light and is practicable because the fluid coupling allows high engine torque for favorable car acceleration and because the governor J always directs a downshift on bringing the car to rest. Thus there is automatically provided a favorable torque-multiplying gearing for starting, as in third.

On bringing the car to a stop in fourth or second, the governor J will close switch 94 thereby energizing solenoid H and venting chamber 74 which causes spring 67 to thrust rods 68 and 62 rearwardly to release sleeve F as the car approaches a stop with attendant low torque at the teeth of sleeve F.

The sleeve F is also disengaged by means operable at the will of the driver while governor switch 94 is open, this means being especially beneficial to enable the driver to quickly step-down the transmission ratio for more favorable torque drive as in passing a car on the road or in climbing a hill. The illustrated driver operable means is preferably arranged for control by depressing the accelerator pedal all the way so that the step-down will occur as a natural result of manipulating the accelerator pedal for maximum power output. The pedal may either be arranged to provide this step-down as the engine throttle approaches its wide open position or subsequently to the throttle reaching its wide open position by providing a mechanism which allows the accelerator pedal to overtravel its throttle actuating range into a secondary range. Devices of this general character may be referred to as kick-down controls.

My invention has particular reference, in its more specific aspects, to improvements in the kick-down control mechanism whereby to automatically limit the operation of the kick-down functions to certain predetermined ranges of car speeds.

One form of my invention is illustrated in Figs. 10 and 12 in conjunction with an accelerator pedal kick-down control adapted to bring about a step-down in the transmission ratio as the accelerator pedal is brought to its fully depressed position corresponding to fully open position of the throttle valve. The gain in power delivered by the engine during the last part of the throttle opening movement is so slight that ordinarily this range may be utilized for the kick-down control without sacrificing desired car performance including drive at wide open throttle in second and fourth. However, as it may be desired to provide a distinct kick-down range for the accelerator pedal, in addition to its throttle-moving range, I have made provision so that my invention is equally well adapted to either arrangement.

The accelerator pedal 50 is yieldingly urged in its throttle closing position of release by a spring 109. This pedal is operably connected in Figs. 10 and 12 by linkage 110 with the lever 111 fixed to shaft 112 which carries the throttle valve 113 which is positioned in manifold riser 114 between the carburetor 115a (Fig. 1) and the manifold distributing branches 116 leading to the various cylinders of the engine. At the top of the riser is the usual air cleaner 115. That part of the intake system which extends above valve 113 may be referred to as the atmospheric side of the throttle valve while the parts below the valve extending to the engine may be referred to as the engine side of the throttle valve. When the pedal 50 is fully depressed to position 50' then lever 111 engages stop 117 and valve 113 is fully open as at 113'.

Another electrical circuit, referred to as the kick-down circuit, is arranged similar in some respects to the governor circuit for controlling solenoid H so that when the throttle valve is wide open the solenoid may be energized to release latch 73 thereby allowing spring 67 to take up gap 76 and, in succession, ground the engine ignition, release sleeve F, restore the ignition, and by reason of the open throttle cause the engine to quickly increase its speed to engage clutch E so as to drive the car in either first or third depending on whether the kick-down mechanism was operated while driving in second or fourth respectively.

In order to protect the engine and other parts against attempted kick-down above that car speed where kick-down would be destructive and of little, if any, avail, I have provided a control mechanism as follows:

The kick-down circuit comprises ground 118 through kick-down switch 119, which is closed by lever end 120 when in wide open throttle position 120', thence by conductor 121 to a switch 122, adapted to be closed by a contact bridge piece 123, thence by conductor 124 to the aforesaid conductor 98. Switch 122 is controlled at the intake system of the engine under predetermined desired conditions of car speed, say 50 M. P. H. for example.

The contact piece 123 is carried by a piston 125 in the form of a diaphragm extending across the outer end of a container 126 forming a chamber 127 continuously open to riser 114 so that diaphragm piston 125 is subjected to the vacuum in the riser on the atmospheric side of the throttle valve. A spring 128 yieldingly urges piston 125 outwardly so as to cause contact piece 123 to close switch 122 and permit the kick-down circuit to be formed at switch 119 unless however the vacuum in riser 114 is sufficient to withdraw piston 125 and contact piece 123. In the latter instance the switch 122 is open and even though the switch 119 is closed the kick-down circuit will not be formed and the transmission drive in fourth or second will continue. For convenience of reference it will be assumed that the kick-down is to be operated while driving in fourth as this is the condition most frequently dealt with.

In order to magnify the effect of the vacuum in riser 114 and minimize the size of piston 125, while utilizing structure already used conventionally, and for other practical considerations, I utilize the conventional carburetor Venturi 129 in the down-draft riser 114, the chamber 127 being open by a passage 130 to the throat of the Venturi. The chamber thus communicates with the engine intake system at a point between the throttle valve 113 and atmosphere rather than between the throttle valve 113 and the engine A so that, for a given throttle opening, the same weight of air will always flow through the carburetor Venturi at a given speed of the car in fourth regardless of load and other factors. The chamber 127 is thus open to the suction in the intake riser at a point anterior to the throttle valve 113 rather than at a point posterior to the throttle valve. For simplicity of disclosure I have not illustrated the gasoline supply jet at the carburetor Venturi throat as the same is well known. Such arrangement provides a governor control of great accuracy and simplicity of operation. In the illustrated arrangement the driver endeavors to manipulate the transmission kick-down from fourth to third always by manipulating the throttle valve 113 to the same position, wide open throttle in this instance, because at such time switch 119 is closed. Therefore whether or not the down-shift will actually result will depend on the car speed at such time. If the car speed is under 50 M. P. H. then the down-shift will occur but if the car speed exceeds 50 M. P. H. then the vacuum at Venturi 129 acting in chamber 127 will be sufficient to overcome spring 128 and cause switch 122 to open thereby preventing the step-down. If, while switch 119 is closed and switch 123 is open, the car speed drops down to the assumed 50 M. P. H., as when the car loses speed on an upgrade at fully open throttle, then switch 122 will close when the vacuum falls off to that corresponding to 50 M. P. H. and thereupon completes the kick-down circuit.

After the kick-down from fourth has taken place so that sleeve F is released, then fourth will not again be restored until the driver allows the engine to coast so as to synchronize teeth 49 with sleeve F and cause blocker 52 to unblock the sleeve. The kick-down operation releases sleeve F to the Fig. 5 position and opening of either or both of switches 119 and 122 opens the kick-down circuit and when the vacuum again acts in chamber 74 piston 66 will move to its Fig. 11 latched position preparatory to allowing sleeve F to clutch upon coast of the engine.

The kick-down from second to first and the restoration of second is just the same as from fourth to third except, of course, that because of the different ratio between the engine and vehicle wheels in second compared to fourth, my control system will operate to automatically prevent the kick-down at a speed less than 50 M. P. H. depending on the driving ratio. However when in second the control will always respond to a definite car speed under the same throttle setting and this is beneficial for the second speed ratio where the engine is turning over much faster than in fourth for a given car speed. For a ratio of 2 to 1 for second then my vacuum control will function at 25 M. P. H. if set to function at 50 M. P. H. in fourth.

In the Fig. 13 modification the switch 119 is not closed when the throttle valve is at wide open position but in response to movement of the accelerator pedal 50 beyond its wide open throttle position 50' through a secondary range of movement at 50'' at which time the conductor end portion 120 of throttle lever 131 is at its switch-closing position 120'. In Fig. 13 the pedal 50 is connected through linkage 132 to bell-crank lever arm 133 loose on the valve shaft 112, lever 131 being the other arm of the bell-crank. Fixed to shaft 112 is the lever 134 having a projection 135 urged into continuous contact with lever 133 by a spring 136 acting between levers 133 and 134. The stop 117 now engages lever 134 at wide open throttle.

In the Fig. 13 arrangement, depressing pedal 50 to position 50' will result in opening the throttle valve to wide open position 113' because the spring 136 will cause lever 134 to follow the movement of lever 133 and pedal 50. However, as pedal 50 is further depressed to the overtravel kick-down position 50'', stop 117 holds lever 134 at wide open throttle position while spring 136 yields to allow lever 131 to close switch 119 as at 120' for the kick-down function unless, just as in Fig. 12, the switch 122 is open. The Fig. 13 control operates exactly as described for Fig. 12 except, of course, for the overtravel function as noted.

In the Fig. 14 modification, which likewise may be substituted for the Fig. 12 form, I have provided a single switch 137 between ground 118 and the aforesaid conductor 124, this switch serving both as a kick-down switch and vacuum car speed control.

In Fig. 14 I have illustrated a sliding piston 138 as an alternative of the Fig. 12 diaphragm piston, this piston 138 sliding upwardly in cylinder 139 against the action of spring 140 as the vacuum increases at the aforesaid carburetor Venturi 129. Pivoted to the piston 138 is an electrically insulating switch actuating element 141 adapted to swing to the left as viewed in Fig. 14 thereby sliding the conductor 142 into contact with the terminals of switch 137 so as to establish the kick-down circuit to the solenoid H and interrupter switch 78 just as before.

At the right side of element 141 there is a plunger actuator 143 normally moved out of contact with element 141 but adapted for engagement by the end 120 of lever 144 which is fixed to the valve shaft 112. Lever 144 has an actuating lever 145 fixed to swing therewith, the lever 145 being connected as before to pedal 50 through the linkage 132. The arrangement is such that as the throttle valve 113 nears its wide open position the pedal at position 50ª has brought lever end 120 into the Fig. 14 position wherein plunger 143 bears on element 141, assuming the piston 138 to be lowered as illustrated. Then as the pedal 50 is fully depressed to position 50' of wide open throttle 113', the lever end 120 slides plunger 143 to the left causing element 141 to swing and thereby cause conductor 142 to close switch 137 to bring about step-down change in the transmission by releasing sleeve F. Upon release of the accelerator pedal spring 146 restores conductor 142 to its switch opening position and spring 147 restores plunger 143 into a position accommodating free movement of piston 138. Sleeve F will also, as before, synchronously clutch with teeth 49 assuming that the car speed has not meantime dropped to cause the governor switch 94 to close.

When the car speed exceeds the aforesaid assumed valve of 50 M. P. H. then the vacuum at carburetor Venturi 129 will be sufficient to raise piston 138 against spring 140 thereby lifting element 141 out of the path of movement of plunger 143 so that even if pedal 50 is fully depressed the plunger will not operate conductor 142 and switch 137 will not be closed.

It will be noted that switch 137 takes the place of the two switches 119 and 123 in Figs. 12 and 13. If, while the piston 138 is raised, the pedal 50 is fully depressed and then piston 138 tends to be lowered by loss of vacuum due to the car slowing down, then element 141 merely rests on top of the left-hand end of plunger 143 until pedal 50 is released whereupon spring 147 withdraws plunger 143 and allows element 141 to take its Fig. 14 position.

Among the advantages of the Fig. 14 arrangement is that the switch 137 is free from the thrust load of piston 138 both from the vacuum and the spring 140 as conductor 142 is not loaded by the piston.

In Fig. 15 I have illustrated the same mechanism shown in Fig. 14 but arranged for operation when pedal 50 is operated between its wide open throttle position to its position 50" overtravelling the throttle opening range. In Fig. 15 the same overtravel linkage of Fig. 13 is employed, it being understood that when pedal 50 is at position 50' then the end 120 of lever 131 has engaged plunger 143 so that as the pedal moves to position 50" the resulting movement of plunger 143 and element 141 causes conductor 142 to close switch 137 and complete the kick-down circuit as before. Otherwise the Fig. 15 mechanism operates just like that described for Fig. 14.

Referring to the Fig. 16 embodiment the piston 148 operates generally the same as piston 138 but is now of non-conducting material and is formed with a lower lug 149 which, prior to vacuum operation of piston 148, urges the spring conductor 150 downwardly against the upper face of the fixed non-conducting material 151. The conductor 150 is carried by plunger 152 and is yieldingly moved to the Fig. 16 position by spring 153. When the accelerator pedal is fully depressed, either to its wide open throttle position as in Fig. 14 or through an overtravelling range as in Fig. 15, depending on which arrangement is preferred, plunger 152 and conductor 150 slide to the left until at the end of the pedal stroke the conductor end 154 contacts with terminal 155 thereby completing the kick-down circuit from ground 118 through conductor 150, terminal 155 and conductor 124 to the solenoid H and interrupter switch 78 just as hereinbefore set forth.

When the car speed is such that the vacuum raises piston 148 then conductor 150 springs upwardly out of contact with material 151 and cannot complete the circuit at terminal 155 although the plunger 152 is free to reciprocate under action of the accelerator pedal and spring 153. If, while piston 148 is raised and pedal 50 is fully depressed, the car speed falls to the point where piston 148 is lowered by spring 140, then the conductor part 154 contacts with terminal 155 and thereupon establishes the kick-down circuit. The conductor 150 therefore constitutes a switch in that it controls the kick-down circuit.

Among the advantages of the Fig. 16 arrangement is the circumstance that the switch points at 155 and 154 are free from the thrust load imposed from the accelerator pedal at lever end 120 because the end of spring member 150 does not thrust against any electrical contact in the direction of movement of member 150 by lever end 120.

In the Fig. 17 embodiment the vacuum operated piston 156 carries a conductor 157 pivoted at 158 to a plunger 159 upwardly slidable in piston 156 but normally urged downwardly therefrom by a spring 160. This arrangement allows the conductor 157 a certain amount of movement independently of piston 156 in order to seat on the conductor pieces 161 and 162. The conductor piece 161 is fixed and piece 162 comprises a plunger urged to the right out of contact with conductor 157 by a spring 163. The right end of this plunger is adapted for engagement and operation by the aforesaid lever end 120 which may be arranged, as in Fig. 16, either for establishing the kick-down at wide open throttle or when overtravelling.

The piston 156 has its downward stroke under spring 140 limited in any suitable manner, as by piston pin 164 reaching the bottom of the cylinder wall slot 165. By preference, the head 166 has a slight clearance 167 with the piston 156 when the latter is fully seated downwardly. This clearance operates to advantage in conjunction with spring 160 which may be as light as desired to insure a constant engaging pressure of conductor 157 on terminals 161 and 162. The conductor 157 may tilt slightly when plunger 162 is retracted as in Fig. 17 but when the plunger is operated to the left then any such tilt is relieved, the tilt insuring a positive quick contact. In order to expedite engagement of plunger 162 beneath conductor 157, the left end of plunger 162 is chamfered and the edge of the conductor is rounded as illustrated. In Fig. 17 the contact element 157 is free both from all loads of piston 156 and also from the pedal thrust imparted at lever end 120.

Assuming piston 156 to be lowered, as when the car speed is such as to allow the kick-down to be made, then conductor 157 rests on terminal 161. When lever end 120 is actuated to slide plunger 162 to the left, this plunger contacts with conductor 157 as at 162' and establishes the kick-down circuit from ground 118 through plunger 162, conductor 157 and terminal 161 thence to the solenoid H and interrupter switch 78 just as before. When the car speed is such that vacuum raises piston 156, the conductor 157 is also raised and the kick-down circuit cannot be made until piston 156 lowers although this lowering of the piston may thereupon effect the kick-down as in Fig. 16 provided that plunger 162 occupies the position 162' at such time.

The various conductor parts throughout the several views will, of course, be suitably electrically insulated against undesired grounding or interfering with the desired electrical control systems.

In Figs. 12 to 17 it will be noted that whenever the driver seeks to effect the kick-down change in the transmission speed ratio, the throttle valve in each instance is at a predetermined position so that the vacuum device will, in effect, then operate as a fixed function of car speed. If desired, the kick-down circuits may be completed at less than approximate wide open throttle. Furthermore, by substituting different piston springs for the vacuum operated pistons the illustrated devices may be caused to respond to any desired car speed.

My controlling devices may also be used in conjunction with transmission or other systems wherein an electrical circuit is normally established and adapted to be opened by the throttle opening means under control of the vacuum Venturi system. In order to illustrate this general arrangement, I have shown in Figs. 18 to 20 certain arrangements which correspond generally to the foregoing embodiments but which operate with normally closed switch means instead of normally open switch means.

Referring to Fig. 18 I have illustrated such an arrangement adapted to the type of control shown in Figs. 12 and 13. In Fig. 18 the switches 119 and 122 are now arranged in parallel with each other in any suitable circuit between ground and conductor 124'. Switch 119 is now normally closed and is opened by the lever end 120 of Fig. 12 or Fig. 13 to break the circuit unless the vacuum at the Venturi, as before, is such that switch 122 is closed in which event opening of switch 119 will not break the circuit.

In Fig. 19 I have illustrated an arrangement adapted for use with the lever operator 120 of either Fig. 14 or Fig. 15. However, in Fig. 19 the switch 137 is now normally closed and is opened by lever end 120 in the Fig. 19 position of parts. In the event that the vacuum piston 138 is raised, then lever end 120 cannot open switch 137 because switch actuating element 141 will be withdrawn and the stroke of plunger 143 to the left will not engage conductor 142.

In Fig. 20 I have adapted the Fig. 16 arrangement to a normally closed switch. The spring conductor 150' now has its left end in engagement with an angle shaped conductor surface 155' so arranged that when plunger 148 is down the circuit is established and will remain established, as in Figs. 18 and 19, even though vacuum should raise the piston. Lever end 120, when operated to move conductor 150' to the left, will open the circuit if the piston 148 is down. However, if the piston is raised to allow the conductor to spring upwardly, the circuit will remain closed even though the lever end 120 is operated to the left.

In my specification and claims I use the term "Venturi" in a broad sense. This device, as is well known, increases the velocity and reduces the pressure of the fluid at the Venturi throat. The Venturi may be of any suitable design to obtain the desired pressure magnifying effect. Ordinarily, a commercial carburetor Venturi is formed with frusto-conical portions at each side of the throat as illustrated.

I claim:

1. In a motor vehicle drive having an engine provided with an intake system comprising a throttle valve, a variable speed ratio transmission comprising means operable to effect change in the speed ratio drive between the engine and vehicle, a throttle-valve-adjusting element adapted for manipulation by the vehicle driver, means responsive to predetermined manipulation of said element for causing operation of said speed ratio change means, said throttle valve being disposed in approximately its fully open position in response to said predetermined manipulation of said element, and means operably responsive to sub-atmospheric pressure change in said intake system at the atmospheric side of said throttle valve for preventing operation of said speed ratio change means in response to said predetermined manipulation of said element.

2. In combination with an engine having an induction conduit and a throttle, change speed transmission mechanism connected to said engine, means to shift said mechanism to selectively vary the speed of the motion transmitted thereby relative to the engine speed, automatic means to shift said mechanism into high speed responsive to a predetermined speed of said transmitted motion, throttle operated means for automatically reshifting said mechanism from high speed to transmit a higher ratio of engine to output speed for increased power when said throttle is substantially fully opened, and means responsive to greater than predetermined suction in said induction conduit anterior to said throttle to render said throttle operated means ineffective to reshift said mechanism.

3. In a motor vehicle drive having an engine provided with an intake system comprising a throttle valve, a variable speed ratio transmission comprising means operable to effect change in the speed ratio drive between the engine and vehicle, a throttle-valve-adjusting element adapted for manipulation by the vehicle driver, means responsive to manipulation of said element to a predetermined position in throttle valve opening direction for causing operation of said speed ratio change means, and means operably responsive to sub-atmospheric pressure change in said intake system at the atmospheric side of said throttle valve for preventing said operation of said speed ratio change means in response to manipulation of said element as aforesaid.

4. In combination with an engine having an induction conduit and a throttle, change speed transmission mechanism adapted for operable connection to said engine, means operable to effect step-up and step-down change in drive setting of said mechanism to vary the speed of the motion transmitted thereby relative to the engine speed, means automatically operating to effect step-up operation of said speed varying means into high speed setting responsive to predetermined speed of said transmitted motion, throttle operating means for automatically effecting step-down operation of said speed varying means from said high speed setting to transmit a higher ratio of engine to output speed for increased power when said throttle is operated to a predetermined position, and means responsive to greater than predetermined suction in said induction conduit anterior to said throttle to render said throttle operating means ineffective to cause said step-down operation as aforesaid.

5. In combination with an engine having an intake conduit for power producing fluid and a throttle therein; vehicle driving speed ratio change transmission mechanism operably connected to said engine; a first automatic means responsive, at least in part, to predetermined vehicle speed to effect speed ratio change in said mechanism; a second automatic means adapted to function in response to movement of said throttle to a predetermined position to again effect speed ratio change in said mechanism; and a device responsive to predetermined suction conditions in said intake conduit anterior to said throttle to render said second automatic means inoperative to function as aforesaid.

6. In combination with an engine having an induction conduit, a throttle therein, a throttle operator, change speed transmission mechanism connected to said engine, said mechanism including a drive of predetermined ratio of engine to transmission output speed automatically engaged when the speed of the transmission output member exceeds a predetermined rate, means actuated by said throttle operator to automatically reshift said mechanism to transmit another drive of higher ratio of engine to output speed when said throttle is moved to a predetermined position, and a device actuated by greater than predetermined suction in said induction conduit anterior to said throttle to render said throttle operator ineffective to shift said mechanism.

7. In combination with an internal combustion engine having a carburetor with an induction conduit and throttle therein, change speed transmission mechanism connected to said engine, said mechanism including a relatively fast speed drive, speed responsive means for controlling shifting of said mechanism into fast drive position, means to shift said mechanism into position for relatively slow speed drive operation, an electro-magnetic device for controlling reshifting of said mechanism from fast drive position into slow drive position, electrical circuit means including a switch operable between closed and open positions thereof for controlling energization of said electro-magnetic device, throttle operating means to operate said switch to one of its said positions when said throttle is approximately fully opened thereby to effect said reshifting of said mechanism, and a device responsive to greater than predetermined suction in said induction conduit anterior to said throttle to prevent said operation of said switch to its said one position by said throttle operated means.

8. In a motor vehicle drive having an engine provided with an intake system of the type having a throttle valve for controlling air flow from the atmosphere to the engine; a variable speed ratio transmission adapted to receive drive from the engine for driving the vehicle; means operable to adjust said throttle valve; transmission control means operable for effecting change in the speed ratio drive of said transmission; and means utilizing pressure variation in said intake system at the atmospheric side of said throttle valve for automatically effecting overruling of the operation of said transmission control means in response to the engine operating above a predetermined speed accompanied by predetermined adjustment of said throttle valve in throttle opening direction.

9. In a motor vehicle drive having an engine provided with an intake system of the type having a throttle valve for controlling air flow from the atmosphere to the engine; a variable speed ratio transmission adapted to receive drive from the engine for driving the vehicle; means operable to adjust said throttle valve; transmission control means operable in response to operation of said throttle valve adjusting means to a predetermined position thereof in throttle opening direction for effecting change in the speed ratio drive of said transmission; and means utilizing pressure variation in said intake system anterior to said throttle valve for automatically effecting overruling of the operation of said transmission control means in response to the engine operating above a predetermined speed accompanied by adjustment of said throttle valve adjusting means to the aforesaid predetermined position.

10. In a motor vehicle drive having an engine provided with an intake system of the type having a throttle valve for controlling air flow from the atmosphere to the engine; a variable speed ratio transmission adapted to receive drive from the engine for driving the vehicle; means operable to adjust said throttle valve; electrically functioning transmission control means for effecting change in the speed ratio drive of said transmission; switch means adapted to be opened and closed for controlling said electrically functioning means; switch operating means for effecting opening and closing of said switch means in response to operation of said throttle valve adjusting means; and means utilizing pressure variation in said intake system at the atmospheric side of said throttle valve for selectively rendering said switch means either effective or ineffective to be opened and closed as aforesaid during normal operation of the engine.

11. In a motor vehicle drive; an engine having an intake system provided with a throttle valve and a carburetor Venturi disposed in anterior relationship with respect to said throttle valve; means operable to adjust said throttle valve; a variable speed ratio transmission adapted to receive drive from the engine for driving the vehicle; transmission control means operable in response to operation of said throttle valve adjusting means for effecting change in the speed ratio drive of said transmission; and means utilizing pressure variation at said Venturi for overruling said operation of said transmission control means in response to the engine, during its normal operation, attaining a predetermined speed accompanied by predetermined operation of said throttle valve adjusting means in throttle opening direction.

12. In a motor vehicle drive having an engine provided with an intake system of the type having a throttle valve for controlling air flow from the atmosphere to the engine; a variable speed ratio transmission adapted to receive drive from the engine for driving the vehicle; means operable to adjust said throttle valve; transmission control means operable for effecting change in the speed ratio drive of said transmission in response to predetermined positioning of said throttle adjusting means accompanied by operation of the engine within a predetermined speed range; and means utilizing suction in said intake system at the atmospheric side of said throttle valve for automatically effecting overruling of the operation of said transmission control means as a function of engine speed and positioning of said throttle adjusting means so constructed and arranged as to prevent the aforesaid change in the speed ratio drive of said transmission from taking place in response to the aforesaid positioning of said throttle adjusting means accompanied by operation of the engine outside of said predetermined speed range.

13. In a motor vehicle drive having an engine provided with an intake system of the type having a throttle valve for controlling air flow from the atmosphere to the engine; a variable speed ratio transmission adapted to receive drive from the engine for driving the vehicle; means operable to adjust said throttle valve; transmission control means operable for effecting change in the speed ratio drive of said transmission, said transmission control means including electrical circuit means and means for controlling electrical energization thereof in response to predetermined positioning of said throttle adjusting means accompanied by operation of the engine within a predetermined speed range thereby to effect said change; and overruling means for said transmission control means including means utilizing suction in said intake system at the atmospheric side of said throttle valve operating automatically as a function of engine speed and positioning of said throttle valve adjusting means to render said controlling means for said electrical circuit means incapable of effecting said change when said throttle adjusting means is positioned as aforesaid accompanied by operation of the engine outside of said predetermined speed range.

References Cited in the file of this patent

UNITED STATES PATENTS

| Number | Name | Date |
|---|---|---|
| 1,762,066 | Mackey | June 3, 1930 |
| 1,806,705 | Post | May 26, 1931 |
| 1,819,237 | Fleischel | Aug. 18, 1931 |
| 1,838,096 | Fleischel | Dec. 29, 1931 |
| 1,845,818 | Spiller | Feb. 16, 1932 |
| 1,893,644 | Fleischel | Jan. 10, 1933 |
| 1,993,544 | Fleischel | Mar. 5, 1935 |
| 2,019,146 | Livermore | Oct. 29, 1935 |
| 2,051,553 | Fleischel | Aug. 18, 1936 |
| 2,094,449 | Forichon | Sept. 28, 1937 |
| 2,127,589 | Erban | Aug. 23, 1938 |
| 2,146,479 | Horstmann | Feb. 7, 1939 |
| 2,174,313 | Coffey | Sept. 26, 1939 |
| 2,214,099 | Claytor | Sept. 10, 1940 |
| 2,214,100 | Claytor | Sept. 10, 1940 |
| 2,225,493 | Barnes | Dec. 17, 1940 |
| 2,234,015 | Winkler | Mar. 4, 1941 |
| 2,237,264 | Price | Apr. 1, 1941 |
| 2,249,221 | Moseley et al. | July 15, 1941 |
| 2,252,644 | Robin et al. | Aug. 12, 1941 |
| 2,333,668 | Neracher | Nov. 9, 1943 |